United States Patent [19]

O'Connor

[11] Patent Number: 4,603,248

[45] Date of Patent: Jul. 29, 1986

[54] THERMAL CONDITIONER

[75] Inventor: Bruce O'Connor, San Diego, Calif.

[73] Assignee: Sym-Tek Systems, Inc., San Diego, Calif.

[21] Appl. No.: 515,609

[22] Filed: Jul. 21, 1983

[51] Int. Cl.[4] .......................... F27B 9/16; F27D 3/08; A21B 1/26

[52] U.S. Cl. .................................... 219/388; 219/400; 165/122; 432/138

[58] Field of Search ................ 219/388, 400; 198/803; 165/48 R, 80 C, 80 E, 120, 122; 62/63, 65; 432/138

[56] References Cited

U.S. PATENT DOCUMENTS

| | | | |
|---|---|---|---|
| 1,173,273 | 2/1916 | Hubbard | 165/120 |
| 2,585,559 | 2/1952 | Lakso | 198/803 |
| 2,784,566 | 3/1957 | Reynolds | 198/803 |
| 2,873,019 | 2/1959 | Kay | 198/803 |
| 2,911,345 | 11/1959 | Swenson | 198/803 |
| 3,405,531 | 10/1968 | Davis | 62/65 |
| 3,536,132 | 10/1970 | Pecoraro | 165/48 |
| 4,132,216 | 1/1979 | Guibert | 219/400 |
| 4,402,668 | 9/1983 | Cameron | 432/138 |

FOREIGN PATENT DOCUMENTS

| | | | |
|---|---|---|---|
| 961248 | 4/1957 | Fed. Rep. of Germany | 198/803 |
| 132578 | 10/1978 | German Democratic Rep. | 198/803 |

*Primary Examiner*—Roy N. Envall, Jr.
*Assistant Examiner*—Teresa J. Walberg
*Attorney, Agent, or Firm*—Thomas J. Tighe

[57] ABSTRACT

An involuted track is defined by a spiralled wall normal to a planar surface. The planar surface is rotated coaxially with respect to the wall while the wall remains stationary with respect to the surface. Objects are loaded into the track through entrance, conducted along the track by means of the rotating planar surface, and leave the track via an exit. En route, the heat level of the objects are altered to bring them to a desired temperature by the time they reach the exit. The objects are preferably heated or cooled by a forced fluid of suitable temperature.

10 Claims, 4 Drawing Figures

THERMAL CONDITIONER

BACKGROUND OF THE INVENTION

This invention relates generally to apparatuses for thermally conditioning and storing objects in preparation for other activities with or upon the objects.

This specification will discuss in detail the application of this invention to the thermal conditioning of electronic parts such as integrated circuits, transistors, diodes, hybrid circuits, and the like. However, it should be noted that this invention can be used to advantage in any application where objects are being conducted assemble-line fashion and it is desirable to either raise or lower their temperature to a desired temperature en route. As used in this specification, the terms "electronic devices" and "devices" shall include electronic parts listed above and others. Devices are a subset of the term "objects".

This invention presents an apparatus which provides thermal conditioning of objects in assemble-line fashion. By "assemble-line fashion" it is meant that the parts are moved sequentially and serially from the entrance of the conditioner to the exit. In this invention, the first object into the conditioner is the first object out. Typically, objects exiting a thermal conditioner have one or more additional activities performed with or upon them. Many thermal conditioners heretofore presented have required that the objects be conditioned in parallel. A first batch is placed in a conventional conditioner and is thermal conditioned. The objects from the first batch are then withdrawn as required until the first batch is exhausted. Afterward, a second batch is then loaded en mass as was the first. Such batch processing results in dead time and dead space for the conditioner and it necessitates inefficient conditioner configuration because objects from the first batch must be stored in the conditioner until they are needed and objects from the second batch cannot be conditioned until the first batch is exhausted.

Along with the assemble-line fashion of conditioning, this invention presents a unique configuration for the track along which the devices are conducted. As used in this specification, the term "track" is defined as being any means of physically guiding an object along a predetermined path, including, but not limited to, rails, channels and the like. The unique combination of assemble-line fashion conditioning and track configuration permit this invention to occupy a very low profile package and permit this invention to have a very large storage capacity. They also foster more efficient use of the conditioner.

Other advantages and attributes of this invention will be readily discernible upon a reading of the text hereinafter.

SUMMARY OF THE INVENTION

This invention presents an apparatus for bringing an object to and storing it at a desired temperature. It is comprised of a track involuted about an axis or an imaginary circle, the track defining an entrance at one end whereby objects enter the track and an exit at the other end whereby the objects exit the track. The track is preferably comprised of a channel defined by a spiraled wall means and a planar surface, the walls being normal to the surface. The apparatus also comprises a means for conducting the object along the track from the entrance to the exit and a means for altering the heat level of the conducted object at a rate sufficient to bring the object to the desired temperature before the object reaches the exit of the track. The preferable means of conducting the object along the track is to rotate the surface generally coaxially with the axis of the track while holding the wall stationary in relation to the rotating surface. The objects being in frictional contact with the surface are thereby moved along the track in the general direction of rotation. Preferably, the heat levels of the objects are altered by means of an ambient fluid, either heated or cooled, circulating in and about the track which is disposed in a suitably insulated chamber. The fluid is preferably air circulated by a fan means.

It is an object of this invention to provide a means for thermally conditioning objects in assemble-line fashion.

It is a further object of this invention to condition objects on a first-in first-out basis.

It is a further object of this invention to provide a thermal conditioner and storage having an involuted track means.

Other objects of this invention will be seen upon a reading of the text hereinafter.

DESCRIPTION OF THE PREFERRED EMBODIMENT

Figure 1:
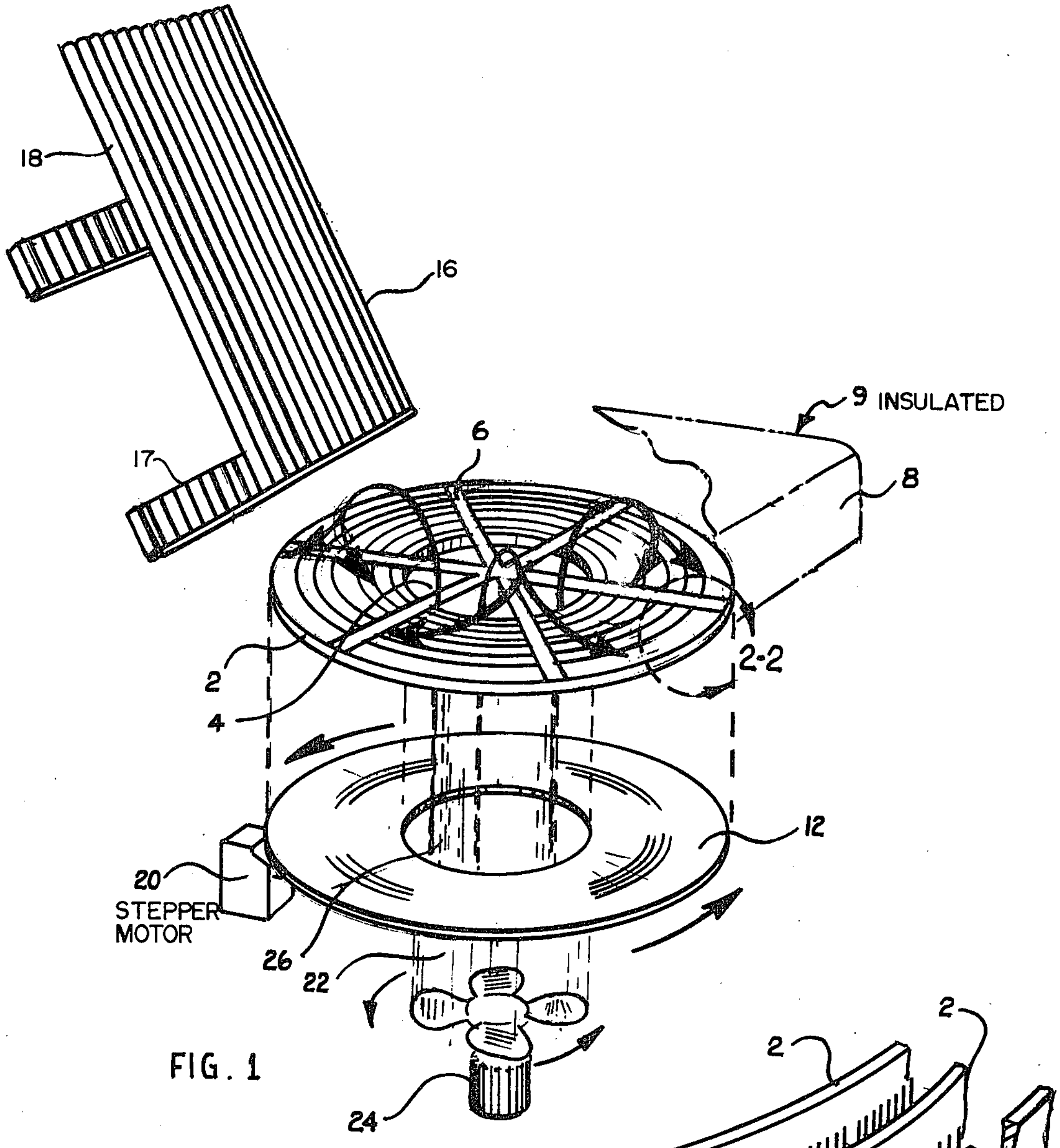
FIG. 1 is an exploded pictorial of the major components of this invention and associated items.
Figure 2:
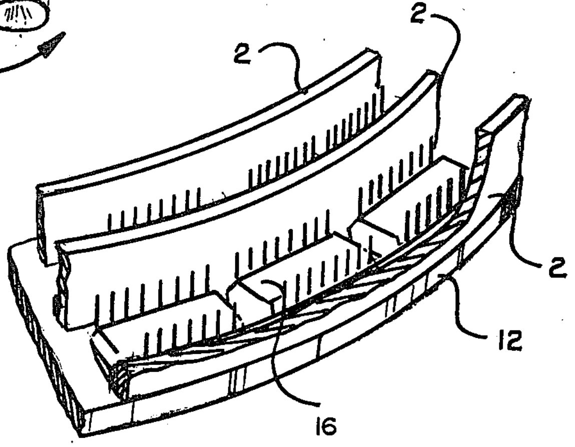
FIG. 2 is a cut away pictorial of portions of two adjacent tracks with the devices therein.

Referring to FIGS. 1 through 4, an involuted track is shown comprising a wall 2 spiralled about an imaginary circle such that it forms a disc-like structure defining an orifice 4 coincident with the imaginary circle. A star shaped cantilever frame 6 is affixed to the top of the track wall 2 and is anchored into a chamber wall 8 by means of tabs 10. The frame maintains the spiralled form of the wall and holds the track wall in a vertical position. The chamber wall 8 is part of a suitably insulated enclosure generally designated 9 which defines a chamber in which this invention resides.

The track wall 2 is disposed upon or in close proximity to a planar surface 12, the track wall being normal to the surface. Together they define an involuted track having an entrance 14 whereby an object enters the track and an exit 15 whereby an object exits the track.

Typically, electronic devices 16 are fed into the track, one at a time, from a device feeder 17 which is in the form of a movable carriage carrying a plurality of devices slidably disposed in a plurality of carrier tubes 18. The track is wide enough to accomodate only one device, thus, the devices are conducted along the track sequentially and serially.

A means for conducting an object along the track from entrance to exit is required. This is preferably accomplished by providing a means for rotating the surface generally coaxially with respect to the axis of the track, a means for holding the wall stationary in relation to the rotating surface, and a means for frictionally contacting the object with the surface. The cantilever frame 6 holds the track wall 2 in place. A stepping motor 20 which drives friction rollers (not shown) in contact with the surface is there means by which the surface is rotated. A stepping motor is used for several reasons. No clutch mechanism nor braking mechanism outside of the motor itself is required. After a step or a series of steps the surface does not coast. The RPM of the motor and, therefore, the surface is programmable up to the maximum RPM of the motor.

Figure 3:
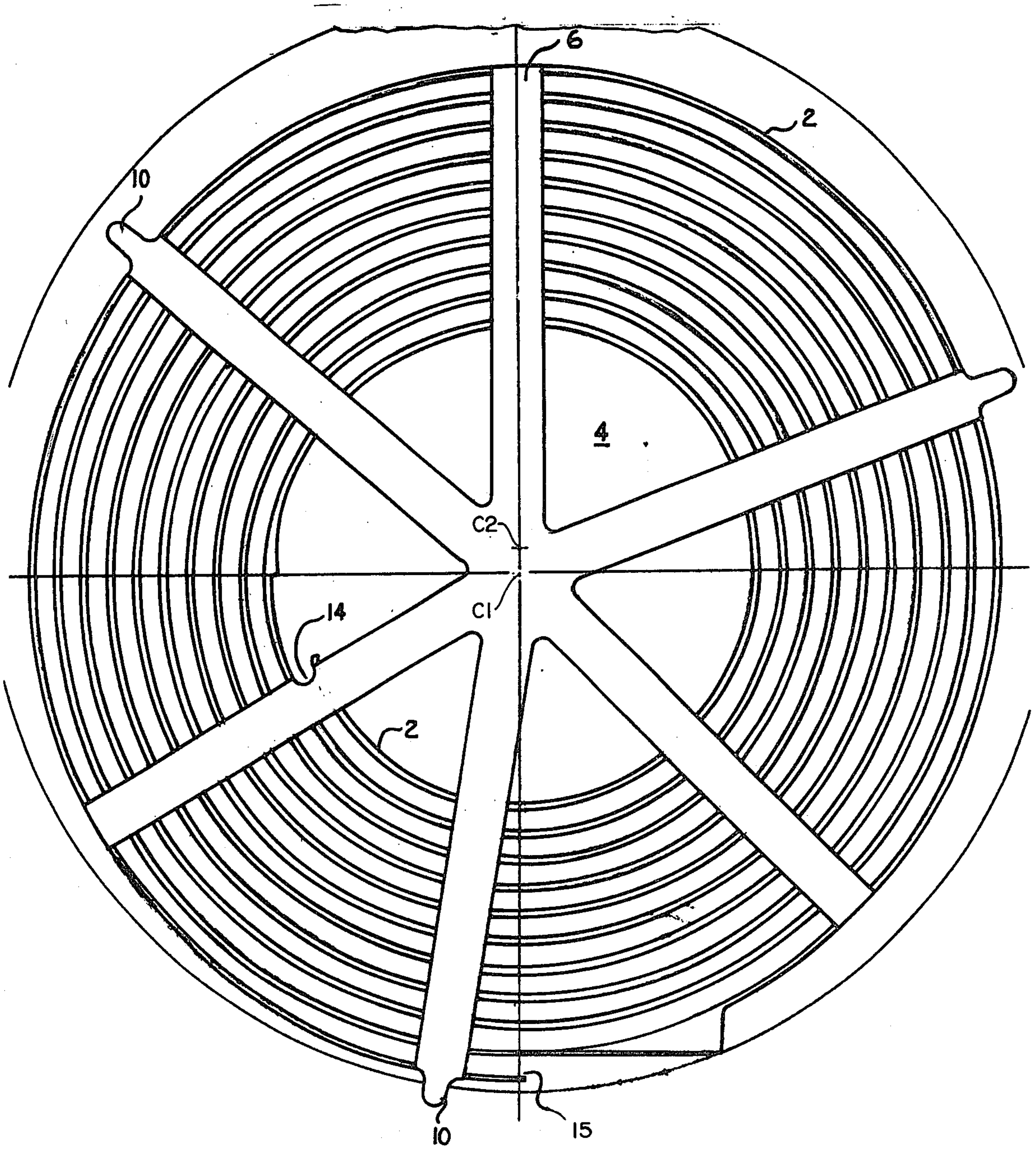
FIG. 3 is a plan view of the eveluded track.
Figure 4:
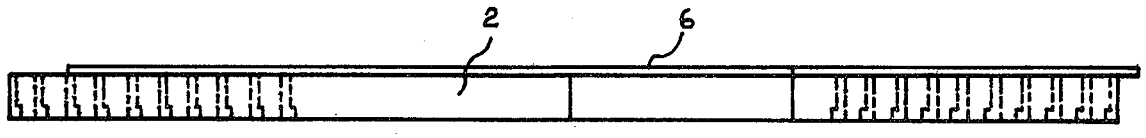
FIG. 4 is a side view of the eveluded track.

In FIG. 3, the track wall 2 is shown in the foreground centered at C1; the planar surface 12 is shown in the background centered at C2. As previously explained, the planar surface 12 is rotated with respect to the track wall 2. The surface is rotated about C2 in order to frictionally move the devices along the involuted track.

It has been found that having the axis of rotation of the planar surface the parallel to but slightly spaced apart from the axis of the track causes smoother loading and device flow along the track. It is believed that the spaced apart axes cause the position of a device in a track to vary with respect to the center of the track. From FIG. 3 it can be seen that the planar surface axis of rotation C2 is offset from C1 in a direction away from the exit 15 and a distance of approximately 1 track width. It has been found that such an offset is an offset suitable to enhance device loading and flow along the track.

The objects are in frictional contact with the surface by means of gravity.

In operation, an object is fed into the track through the entrance and, while the object is being conducted along the track toward the exit, the heat level of the object is altered to bring the object to a desired temperature before the object reaches the exit of the track. Preferably, a means for altering the heat level of the conducted object is comprised of an ambient fluid 22 of suitable temperature circulated within the enclosure 9 by means of a fan means 24. Preferably, the fluid is air which comes into the enclosure by means of an inlet (not shown). The incoming air is then suitably heated or cooled as required. The incoming air can be heated by heat coils (not shown). The incoming air can be cooled by means of exposing liquid nitrogen (not shown) to the air as it enters the enclosure. Once heated or cooled, the air is circulated by the fan 24.

To facilitate the circulation of the fluid in and through the track, an orifice 26 is defined by the surface 12. The surface orifice 26 and the track orifice 4 provide a channel through which fluid can be forced from below. Thus, the heating or cooling means for the fluid and the fluid inlet can be located below the surface of the track.

Devices with protruding leads, such as dual-in-line packaged integrated circuits, traverse the track "dead bug" style, that is, with the leads pointing upward. To prevent such a device from overturning onto its side the track wall at its base has a horizontally extending shoulder such that the wall has a cross-section similar to the letter "L", with the shoulder being the base of the "L". The space between adjacent turns of the track wall and the height and width of the shoulder are set such that the shoulder confines the body of the device without affecting the side exiting leads.

Preferably the wall 2 is milled from an aluminum disc and the surface 12 is also an aluminum disc, both nickel plated, highly polished, and of high strength. It is also preferable that the aluminum be weldable.

It should be noted that although this embodiment shows a track involuted about an imaginary circle, the track may also be involuted about an axis line, in which case, the surface would not define orifice 26.

The foregoing description was given for illustrative purposes only and no unnecessary limitations in the following claims should be derived therefrom.

I claim:

1. An apparatus for bringing an object to and storing it at a desired temperature comprising:
- (a) a planar surface rotatable about an axis normal to the surface,
- (b) a stationary wall means involuted about the axis, the wall means being disposed proximate to the planar surface such that the planar surface and the walls means define an involuted track and also define an entrance at one end of the walls means whereby an object enters the track and exit at the other end of the walls means whereby an object exits the track.
- (c) a means for frictionally contacting the object with the planar surface such that as the planar surface is rotated, the object is frictionally urged along the track from entrance to exit,
- (d) a shoulder means integral with the wall and extending therefrom to prevent axial rotation of the object within the track.

2. An apparatus for bringing an object to and storing it at a desired temperature comprising:
- (a) a planar surface rotatable about a first axis normal to the surface,
- (b) a stationary wall means involuted about a second axis, the wall means being disposed proximate to the planar surface such that the planar surface and the wall means define an involuted track and also define an entrance at one end of the wall means whereby an object enters the track and an exit at the other end of the wall means whereby an object exits the track, the second axis being parallel to but suitably spaced apart from the first axis,
- (c) a means for frictionally contacting the object with the planar surface such that as the planar surface is rotated, the object is frictionally urged along the track from the entrance to the exit, and
- (d) a means for altering the heat content of the object while the object is in the track.

3. The apparatus of claim 2 wherein the wall has a shoulder means extending therefrom adapted to prevent axial rotation of the object.

4. The apparatus of claim 1, 2 or 3 further comprising a suitably insulated chamber in which is disposed the track, and wherein the means for altering the heat level of the object comprises:
- (a) an ambient fluid of suitable temperature circulated within the chamber;
- (b) a means for bringing the fluid to a suitable temperature;
- (c) a means for circulating the fluid.

5. The apparatus of claim 4 wherein the fluid is air and further comprising a fan means for circulating the air.

6. The apparatus of claim 4 wherein the track is involuted about an imaginary circle such that the track defines an orifice, and further comprising a centered orifice defined by the surface, the orifices being for more advantageous circulation of the fluid.

7. The apparatus of claim 6 wherein the fluid is air and further comprising a fan means for circulating the air.

8. The apparatus of claim 4 wherein the means for rotating the surface comprises a stepper motor means.

9. The apparatus of claim 1 or 2 wherein the frictional contacting means is gravity.

10. The apparatus of claim 1 or 2 wherein the means for rotating the surface comprises a stepper motor means.

* * * * *